United States Patent [19]

Powell

[11] 4,107,678
[45] Aug. 15, 1978

[54] POLARIZATION CORRELATION TARGET SEEKER

[75] Inventor: Norman F. Powell, Ilchester, Md.

[73] Assignee: Westinghouse Electric Corp., Pittsburgh, Pa.

[21] Appl. No.: 727,506

[22] Filed: Sep. 28, 1976

[51] Int. Cl.² ............................ G01S 9/02; F41G 7/00; H04B 7/10
[52] U.S. Cl. .................. 343/7 ED; 244/3.19; 343/17.5; 343/100 CL; 343/100 PE
[58] Field of Search ................ 244/3.19; 343/100 CL, 343/100 PE, 17.5, 7 ED

[56] References Cited

U.S. PATENT DOCUMENTS

| 3,202,990 | 8/1965 | Howells | 343/100 CL X |
| 3,290,684 | 12/1966 | Renn et al. | 343/100 CL X |
| 3,832,711 | 8/1974 | Grant et al. | 244/3.19 X |

Primary Examiner—Maynard R. Wilbur
Assistant Examiner—Richard E. Berger
Attorney, Agent, or Firm—H. W. Patterson

[57] ABSTRACT

A target seeker circuit contained in a projectile having a trajectory guidance mechanism cross-correlates returns of a cross-polarized antenna pattern to distinguish between target returns reflected by man-made targets and clutter returns reflected by naturally occurring articles to cause the trajectory guidance mechanism to direct the projectile towards the target. One coordinate of diversity in the cross-polarized returns is achieved by changing the RF frequency of the antenna pattern while a second coordinate of diversity is achieved by changing the aspect range of the clutter. The target returns are distinguished from the clutter returns either by comparison to a threshold value which is set in relation to the worst case clutter level or, alternatively, by comparison to an adaptive threshold which is responsive to the dynamic clutter level.

19 Claims, 7 Drawing Figures

POLARIZATION CORRELATION TARGET SEEKER

BACKGROUND OF THE INVENTION

1. Field of the Invention

The present invention relates to the guidance of projectiles and, more particularly, to the terminal guidance of bombs, rockets and other weapons toward man-made targets when in the presence of ground clutter.

2. Description of the Prior Art

In military conflicts, bombs, rockets and submunitions contained in glide weapons are deployed against radar discrete man-made targets such as bridges, vehicles and buildings. Although, in the use of such weapons, a direct hit on the target is highly desirable, errors in computing the proper release point of the weapon and unpredicted deviations in the weapon trajectories cause unguided weapons to generally miss their intended target. While laser and television weapon guidance systems have proven effective in overcoming these problems, these systems have the limitation that they cannot be employed while certain atmospheric conditions are in effect, specifically, during the presence of a low atmospheric ceiling. Additionally, these weapon guidance systems may require the weapon delivery vehicle to remain in the vicinity of the target after the weapon has been launched. For example, an aircraft may be required to illuminate the target with a laser beam or, alternatively, may be required to sustain communication with the weapon until its impact on the target. Such a requirement greatly mangifies the launch vehicle's exposure to coutermeasures of hostile forces.

There was, therefore, a need for a weapon guidance device which would be operative even under adverse weather conditions and which would operate autonomously of the weapon delivery vehicle.

SUMMARY OF THE INVENTION

In accordance with the present invention, a target seeker circuit controls the trajectory guidance mechanism of a projectile, such as a bomb, to guide the projectile to a man-made target. The target seeker circuit provides an elliptical, cross-polarized antenna pattern by exciting a polarized antenna with a frequency modulated illumination signal and mixes cross-polarized returns of the antenna pattern with the illumination signal to provide cross-polarized, intermediate frequency signals. The cross-polarized, intermediate frequency signals within a predetermined bandwidth are cross-correlated by multiplying the signals together and this cross-correlation product signal is compared to a clutter threshold level to detect the presence of a man-made target.

PREFERRED EMBODIMENT OF THE INVENTION

Figure 1:
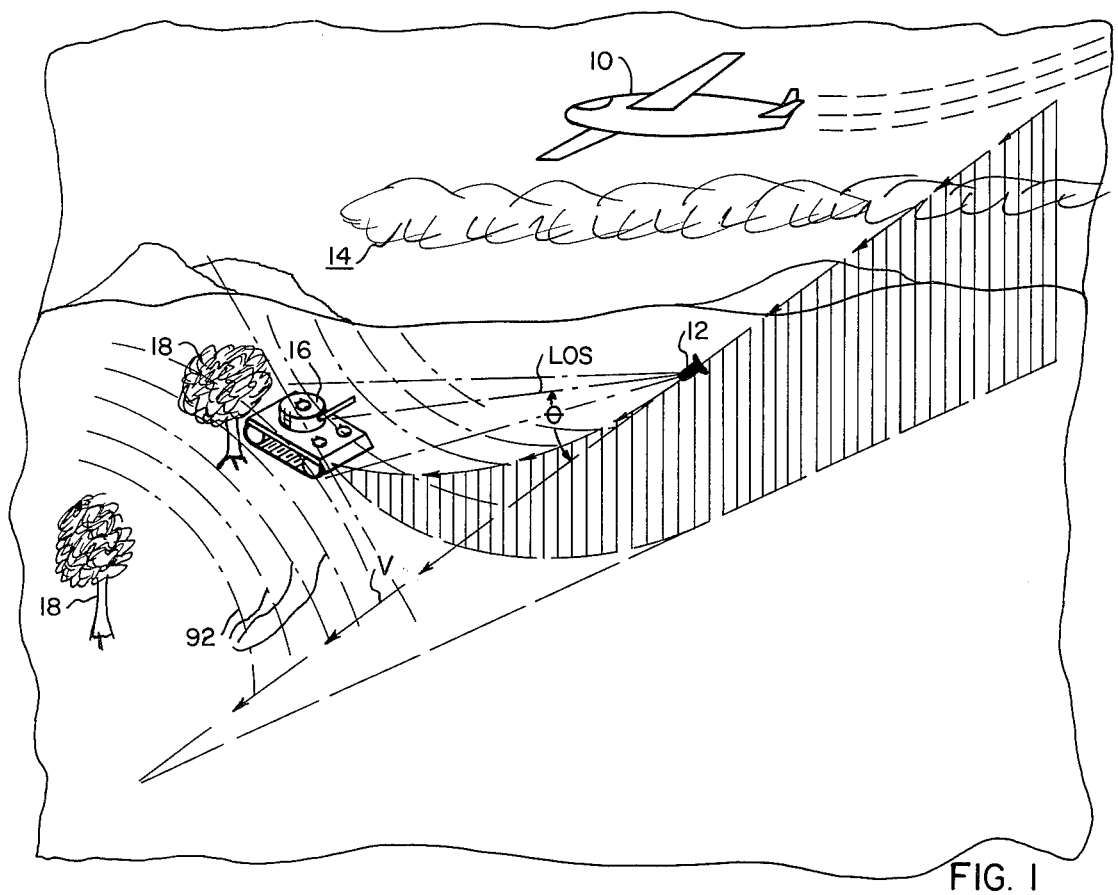
FIG. 1 is an illustration of an operational environment of the present invention.

FIG. 1 illustrates a typical operating environment of the present invention in which a launch vehicle, shown as the airplane 10, has launched an autonomously discriminating weapon 12 which contains the target seeker of the present invention at an altitude higher than the low ceiling imposed by the cloud cover 14. Prior to the release of the weapon 12, a radar set on-board the aircraft 10 has acquired the targert 16 such that the weapon 12 is released in the general direction of the target 16. Typically, a radar set with moving target indication provides sufficiently accurate information for the launch of the weapon 12 against the target 16. Once launched on a generally acceptable trajectory toward the target, the hereafter disclosed target seeking circuit aboard the weapon 12 discriminates between the man-made target 16 and the adjacent ground clutter, exemplified by the trees 18, and controls the trajectory guidance mechanism of the weapon 12 to direct the weapon to impact with the target 16 autonomously of control by the launch vehicle 10. As more specifically described hereafter, the target seeker distinguishes the man-made target 16 from naturally occurring articles, exemplified by the trees 18, by cross-correlating the cross-polarized returns of an elliptical polarized antenna pattern to detect returns from a man-made target.

In an alternative application of the disclosed targer seeker circuit in which a launch vehicle attacks a dispersed group of fixed targerts having known locations, a cluster of autonomously discriminating weapons is launched in a dispersed pattern toward the general target area as determined by a radar set on-board the launch vehicle. A polarization correlation target seeker located in each weapon of the cluster then detects individual targets of the dispersed group and directs its respective weapon toward the particular target.

Similarly, the launch vehicle may release a glide weapon containing smaller autonomously discriminating submunitions which are dispensed from the glide weapon as it approaches an area containing the dispersed targets. Each submunition is provided with the disclosed polarization correlation target seeker and, after release from the glide weapon, the submunitions fly a substantially horizontal trajectory to facilitate target scanning of the seeker as it searches for a target. Upon detection of a target by the seeker, the seeker controls the trajectory control mechanism aboard the submunition to steer the submunition toward impact with the target.

As a further example of an application of the present invention, air launched rockets can be provided with the hereafter described polarization correlation seeker to provide a rocket suitable for use in adverse weather conditions.

Figure 2:
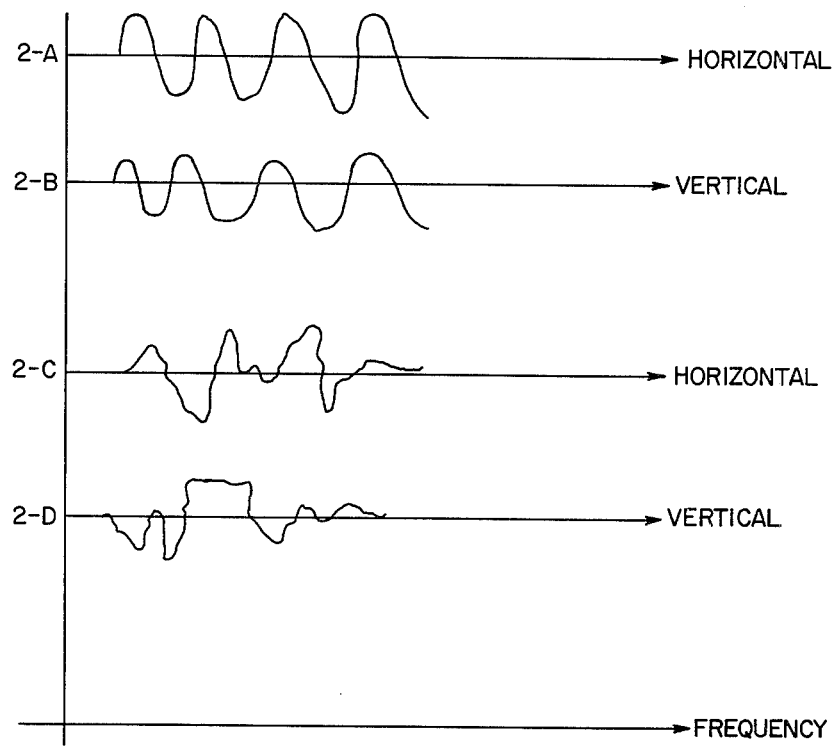
FIG. 2 shows several waveforms depicting cross-polarized antenna pattern returns from a man-made target and from a naturally occurring article.

Referring now to FIG. 2, it will presently be seen that the autonomous target discrimination capability of the polarization correlation target seeker of the present invention is based on a significant natural phenomenon. It has been experimentally determined that man-made targets generally produce backscattering from a radar antenna pattern primarily through reflection from specular surfaces for which the angle of incidence equals the angle of reflection, whereas surfaces of natural objects which comprise background clutter tend to produce random scattering of incident energy. Consequently, backscattering from man-made objects tends to image the transmitted signal whereas backscattering from natural objects tends to be of random amplitude and phase. Furthermore, the specular scattering surfaces of man-made targets have been found to be double-curved surfaces so that the specular reflection of man-made targets tends to be correlated for various polarizations of the antenna pattern. The polarization of an antenna is defined as the direction of the electric field vector of the antenna pattern. In contradistinction to the specular returns of man-made targets, the diffused scattering provided by surfaces of natural objects tends to promote non-correlation for various polarizations of the antenna pattern.

FIG. 2 illustrates this disparity between the returns from a man-made target and the returns from background clutter comprised of naturally occurring objects. Waveforms 2-A and 2-B of FIG. 2 illustrate the backscattering of a man-made target for a horizontally polarized illumination pattern and for a vertically polarized illlumination pattern respectively. Waveforms 2-C and 2-D respectively illustrate the backscattering from a horizontally polarized illumination pattern and from a vertically polarized illumination pattern due to a naturally occurring object such as the trees 18 illustrated in FIG. 1. As illustrated in FIG. 2, man-made targets, by virtue of their specular scattering from double-curved surfaces, will tend to produce a backscattered signal that is highly correlated in orthogonal polarizations over a wide frequency band when illuminated by orthogonally polarized, frequency modulated, radio frequency signals. Conversely, due to their random nature, returns from naturally occurring objects, hereafter sometimes referred to as ground clutter, will generally be uncorrelated in orthogonal polarizations when illuminated by orthogonally polarized, broadband radio frequency energy.

Illumination patterns which are polarized at different angles with respect to each other are generally referred to in the art as cross-polarized. Since horizontally and vertically polarized illumination patterns are orthogonal with respect to each other, they are referred to herein as constituting a specific example of cross-polarized signals. However, the use of the term cross-polarized in the present application is also intended to encompass the more general case of illumination patterns which are not substantially orthogonal. Of course, backscattering from other polarities not necessarily vertical or horizontal and not necessarily orthogonal with respect to each other would exhibit characteristics similar to those illustrated in FIG. 2.

From an examination of the waveforms of FIG. 2, it will be recognized that the cross-correlation of the cross-polarized backscatter returns from man-made targets shown in waveforms 2-A and 2-B may be used to distinguish such targets from the uncorrelated cross-polarized backscatter returns of clutter shown in waveforms 2-C and 2-D. As is further described in relation to FIG. 3, the preferred embodiment of the present invention performs this cross-correlation function by multiplying the horizontally polarized signals by the vertically polarized signals. It will be seen that the multiplication of the correlated waveforms 2-A and 2-B and their subsequent integration will yield a higher value than the multiplication and integration of the waveforms 2-C and 2-D such that a comparison of the two values may be utilized to determine when the backscatter returns are correlated and, consequently, whether the backscatter returns are reflected from a made-made target.

Figure 3:
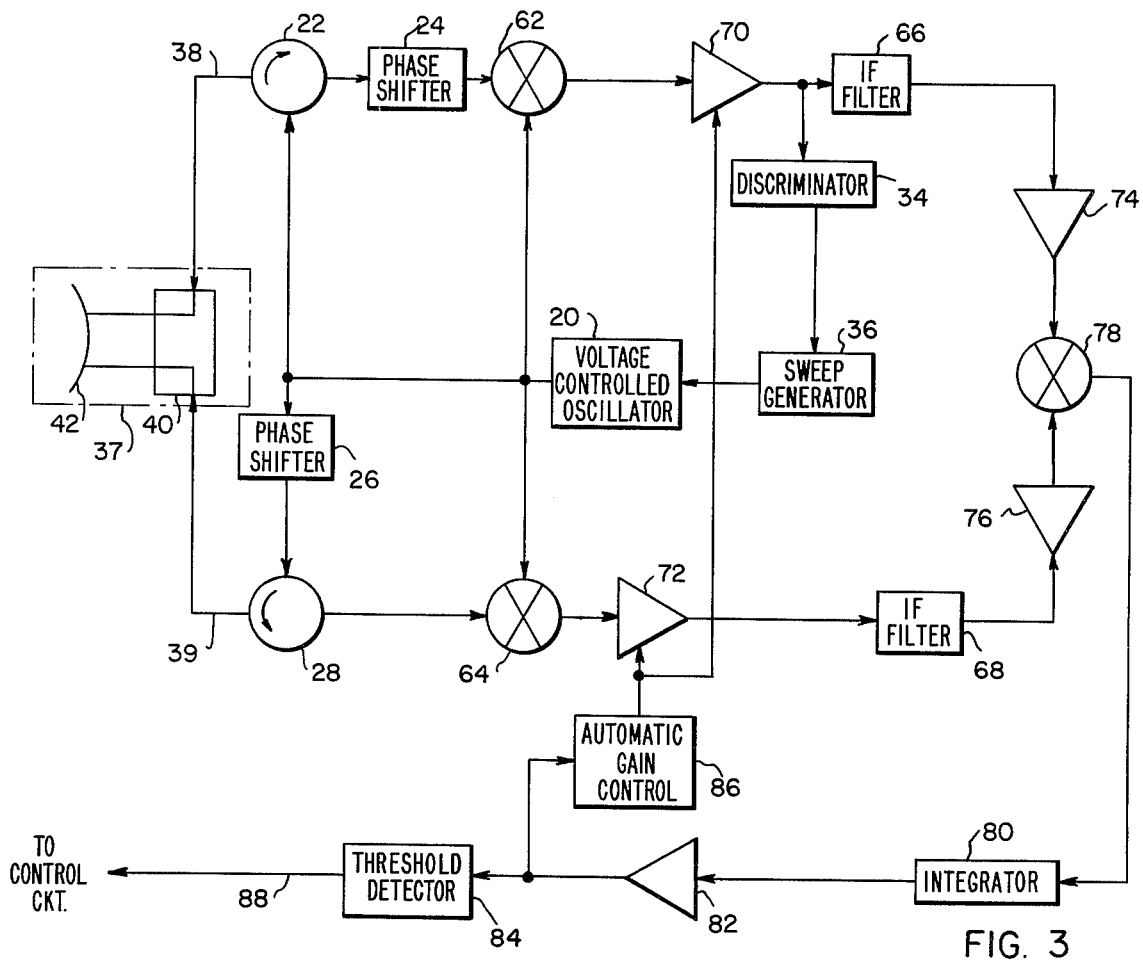
FIG. 3 is a block diagram of the present invention which operates to discriminate targets in response to information samples which have one coordinate of statistical independence.
Figure 4:
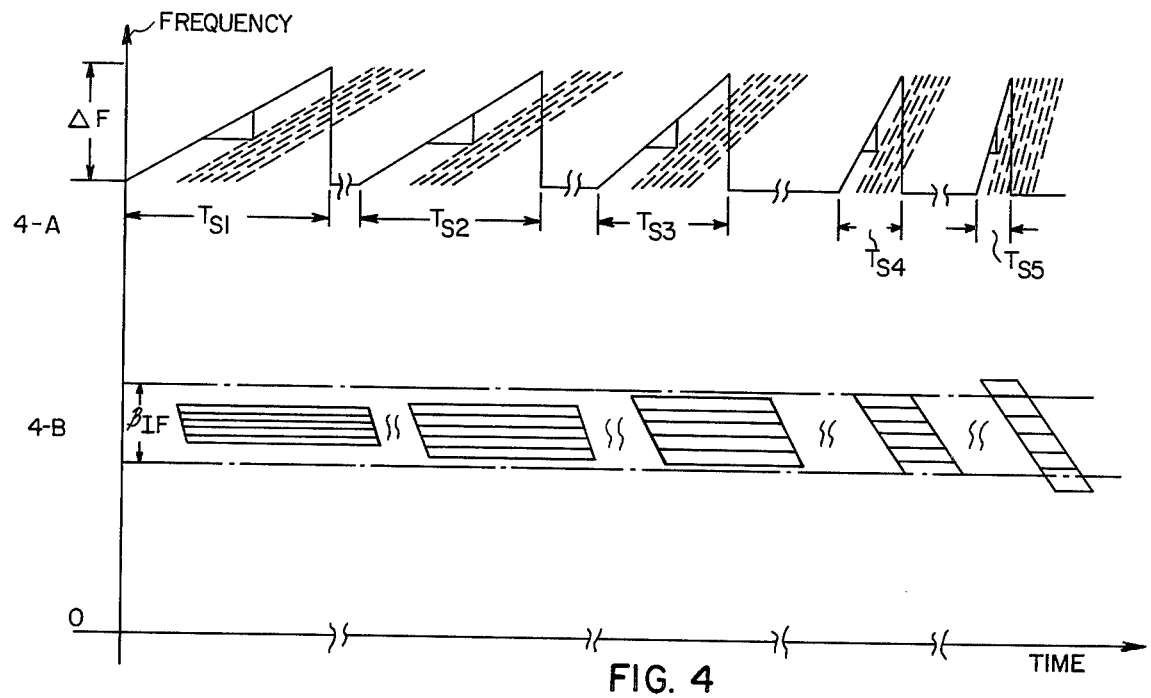
FIG. 4 shows waveforms which illustrate a typical operation of the present invention as shown in FIG. 3.

As more specifically hereafter described in relation to FIGS. 3 and 4, the preferred embodiment of the present invention which exploits the phenomenon of correlation between cross-polarized returns from man-made targets, involves the cross-correlation of orthogonally polarized backscattering from an elliptical, cross-polarized illumination pattern of a continuous wave signal which is frequency modulated over a wide radio frequency band. The apparatus shown in FIG. 3 performs the operation of cross-correlation in which the sum of target signal backscattering plus clutter backscattering of a first polarization is multiplied by the sum of correlated target signal backscattering plus uncorrelated clutter backscattering of a second polarization but in time correspondence with the backscattering of the first polarization. The cross-correlation product is then compared with a clutter threshold of a predetermined level to discriminate the detection of targets as is hereinafter further explained.

In the apparatus of FIG. 3, a means for generating an illumination signal is shown which includes a voltage controlled oscillator 20, a horizontal circulator 22, a horizontal phase shifter 24, a vertical phase shifter 26 and a vertical circulator 28. The generating means also includes a discriminator 34 and a sweep generator 36 which serve to frequency modulate the output of the voltage controlled oscillator 20 as hereafter more fully explained in relation to FIG. 4.

The voltage controlled oscillator 20 provides a continuous wave illumination signal to the circulator 22 and also to the circulator 28 through the phase shifter 26. The frequency of the continuous wave illumination signal provided by the voltage controlled oscillator 20 is frequency modulated in accordance with a signal applied to the voltage control port of the voltage controlled oscillator 20 by the sweep generator 36. For the example of the embodiment of FIG. 3, the frequency of the illumination signal is modulated in a sawtooth waveform over a predetermined frequency bandwidth ($\Delta F$) which is determined in relation to the detection characteristics required for the target seeker as hereinafter more fully explained. The illumination signal of the voltage controlled oscillator 20 which is provided to the circulator 22 is carried in a clockwise direction through the circulator 22 such that it is then provided to the orthogonal antenna 37 over the line 38. In addition, the illumination signal of the voltage controlled oscillator 20 is phase shifted by ninety degrees by the phase shifter 26 and is then provided to the circulator 28. In a similar manner as for the circulator 22, the phase-shifted illumination signal provided to the circulator 28 is carried through the circulator 28 in a counterclockwise direction such that it is then provided to the orthogonal antenna 37 over the line 39. The orthogonal antenna 37 is comprised of an ortho mode transducer 40 which is responsive to the signals on the lines 38 and 39 and a parabolic reflector antenna 42, which is fed through its center by the ortho mode transducer 40 to provide a circular antenna beam pattern in response to the orthogonally phased signals of equal amplitude applied from lines 38 and 39 as is well known and understood by those skilled in the pertinent art. Alternatively, well-known modifications to the circuit of FIG. 3 could cause the circulators 22 and 28 to provide illumination signals which are phase shifted by some angle substantially different than ninety degrees and could also cause the circulators 22 and 28 to provide outputs of different magnitude to cause the antenna 37 to produce an elliptical antenna beam pattern without otherwise substantially affecting the operation of the described apparatus. As used herein, therefore, the description of the antenna beam pattern as being circular is intended as a specific example of the more general case of an elliptical beam pattern.

The backscattering returns from target and clutter reflectors are collected by the parabolic antenna 42 and transferred back to the ortho mode transducer 40 which segregates return signals of a horizontal polarization from return signals of a vertical polarization. In accordance with common antenna design techniques, a splash plate is located at the focus of the parabolic antenna 42 to provide the desired illumination on the parabolic reflecting surface. The horizontally polarized backscattering returns are provided to the circulator 22 over the line 38 and are carried through the circulator 22 in a clockwise manner so that they are provided to the horizontal phase shifter 24. The horizontal phase shifter 24 shifts the phase of the returns from the circulator 22 by ninety degrees and applies these phase shifted horizontal returns to a mixer 62. The vertically polarized backscattering returns are provided over the line 39 to the circulator 28 and are carried in a counterclockwise manner through the circulator 28 to a mixer 64. Therefore, it will be seen that the circulators 22 and 28 serve to isolate the transmitted illumination signal of the voltage controlled oscillator 20 from the backscattered returns collected by the antenna 29. It will also be seen that the signals provided by the circulator 28 to the mixer 64 are phase coherent with respect to the signals provided by the phase shifter 24 to the mixer 62 due to the ninety degree phase shifts which occur in the phase shifter 24 and the phase shifter 26.

The mixers 62 and 64, in combination with an intermediate frequency filter 66 and an intermediate frequency filter 68, provide a means for mixing the polarized returns of the illumination pattern with the illumination signal to provide intermediate frequency signals having a predetermined bandwidth. Mor specifically, in addition to the signal provided by the phase shifter 24, the mixer 62 is provided with the illumination signal of the voltage controlled oscillator 20 and operates to form the mixing products of the two input signals. The mixing products, including the intermediate frequency signal which is the difference frequency of the applied signals, are provided to the intermediate frequency filter 66 through an amplifier 70, the operation of which is subsequently described in relation to a comparing means. The intermediate frequency filter 66 (hereafter sometimes referred to as the IF filter 66) has a predetermined bandwidth which is centered at the difference frequency of the signals provided to the mixer 62 such that the IF filter 66 filters out the higher frequency mixing products to provide at its output intermediate frequency signals of a predetermined bandwidth. Since the intermediate frequency signals are a product of mixing the illumination signal with backscattering returns having a horizontal polarization, these signals may be referred to as horizontal intermediate frequency signals, (hereafter sometimes referred to as horizontal IF signals). In a manner similar to that of the mixer 62, in addition to the signal provided by the circulator 28, the mixer 64 is provided with the illumination signal of the voltage controlled oscillator 20 so that the mixer 64 provides an output which is the mixing products of the vertically polarized backscattering returns and the illumination signal to the intermediate frequency filter 68 through the amplifier 72 which is included in a comparing means that is more particularly described hereafter. The intermediate frequency filter 68 (hereafter sometimes referred to as IF filter 68) has a predetermined bandwidth which is centered at the difference frequency of the signals provided to the mixer 64 such that the IF filter 68 filters out the higher frequency mixing products to provide at its output intermediate frequency signals of a predetermined bandwidth. Since the intermediate frequency signals are a product of mixing the illumination signal with the backscattering returns having a vertical polarization, these signals may be referred to as vertical intermediate frequency signals, (hereafter sometimes referred to as vertical IF signals). The horizontal IF signal of the filter 66 and the vertical IF signal of the IF filter 68 are respectively provided through an amplifier 74 and an amplifier 76 to a cross-correlating means.

The cross-correlating means which is responsive to the horizontal IF signal of the IF filter 66 and the vertical IF signal of the IF filter 68 includes a multiplier 78 and an integrator 80. The multiplier 78 and the integrator 80 operate to correlate the horizontal IF signal and the vertical IF signal of the above-described mixing means to provide a cross-correlation signal. The multiplier 78 operates to form the product of the horizontal and vertical IF signals and the integrator 80, which is comprised of a low pass filter, integrates these signals to perform a cross-correlation operation as familiar to those skilled in the art. The cross-correlation signal of the integrator 80 is amplified by an amplifier 82 and provided to a comparing means to determine whether there is sufficient correlation between the horizontal and vertical IF signals to indicate the existence of a man-made target among the reflectors creating the backscattering returns collected by the antenna 37 based upon the correlation of cross-polarized target returns as was above described in relation to FIG. 2.

Generally, the above-mentioned comparing means compares the cross-correlation signal of the cross-correlating means to a target threshold level to determine the detection of correlated cross-polarized target returns. In the specific embodiment of FIG. 3, the comparing means includes the amplifiers 70 and 72, a threshold detector 84, and an automatic gain control circuit 86. The threshold detector 84 compares the cross-correlation signal provided by the integrator 80 to a predetermined target threshold level which is established under the assumption of worst case conditions for anticipated signal-to-clutter ratios in the backscattered returns. When the cross-correlation signal exceeds the pedetermined target threshold level, the threshold detector 84 indicates the presence of a man-made target, and provides an output signal on line 88 to the mechanism for controlling the trajectory of the weapon. It is well known that the average level of clutter returns depends upon the type of terrain reflecting the backscattered clutter signal. For example, the average level of clutter backscattering is higher over a terrain covered by heavy vegetation than the backscattering level over barren desert. Since the threshold detector 84 compares the cross-correlation signal of the integrator 80 with a predetermined target level, and since the average level of clutter signals is dependent upon the terrain which reflects the backscattered clutter signal, the automatic gain control 86 and the amplifiers 70 and 72 are necessary to maintain the average level of clutter included in the cross-correlation signal of the integrator 80 constant in relation to the predetermined target level of the threshold detector 84. Maintaining the clutter included in the cross-correlation signal at a constant average will prevent the cross-correlation signal from exceeding the predetermined target level of the threshold detector 84 due to an increase in the level of the clutter so as to indicate the presence of a man-made target when, in fact, no such target is present. Likewise, maintaining the clutter in the cross-correlation signal at a constant average will also prevent the clutter level of the cross-correlation signal from becoming so low that the cross-correlation signal fails to exceed the predetermined target level even when a target is present. The automatic gain control 86, which is comprised of a constant false alarm rate circuit, determines the average amplitude level of the cross-correlation signal of integrator 80 and controls the gain of the amplifiers 70 and 72 in inverse relation to the average amplitude level of the cross-correlation signal. That is, as the amplitude level tends to increase, the automatic gain control circuit 86 decreases the gain of the amplifiers 70 and 72 to desensitize the response of the amplifiers 70 and 72 so that the level of the horizontal and vertical IF signals is maintained constant. As a consequence of the amplitude level stabilization in the horizontal and vertical IF signals, the amplitude level of the cross-correlation signal, which is the integral of the product of the horizontal and vertical IF signals, is also stabilized. In a similar manner, when the average amplitude level of the cross-correlation signal of the integrator 80 tends to decrease, the automatic gain control circuit 86 increases the gain of the amplifiers 70 and 72, to increase the sensitivity of the amplifiers 70 and 72 thereby stabilizing the amplitude level of the horizontal and vertical IF signals. As a consequence of the stabilization of the amplitude of the horizontal and vertical IF signals, the frequency of the cross-correlation signal is also stabilized. Therefore, the average amplitude level of the cross-correlation signal is maintained at a predetermined value relative to the predetermined target threshold level established in the threshold detector 84.

Because the disclosed target seeker of FIG. 3 is located in a weapon which is approaching a target, it will be appreciated that the range between the target and the target seeker of FIG. 3 is continually closing.

Since the IF signals of the above-described target seeker are provided by mixing the cross-polarized, backscattered returns with the illumination signal which is being transmitted at the time when the returns are received, and since the illumination signal is frequency modulated with time, the frequency of IF signals which are obtained from the multipliers 62 and 64 will depend, neglecting doppler effects, upon the delay between the transmission of the illumination signal and the reception of a corresponding return, and upon the rate of frequency modulation of the illumination signal.

As is well known and understood by persons skilled in the radar art, a consequence of the constant propagation speed of electromagnetic waves through the atmosphere is that backscattering returns of an illumination pattern are received in inverse proportion to their distance from the antenna. Therefore, it will be seen that the bandwidth of the IF filters 66 and 68 will define the dimensions of a range cell in the illumination pattern of the antenna 37 from which the cross-polarized backscattering signals will be effective to comprise the horizontal and vertical IF signals and outside of which backscattering signals will be excluded.

Although the delay between the transmission of the frequency modulated illumination signal and the reception of a corresponding backscattering return will vary in time due to the decreasing range between the target and the target seeker, the horizontal and vertical IF signals may be maintained at a constant frequency within the fixed bandwidth of the IF filters 66 and 68 by appropriately adjusting the rate of frequency modulation of the illumination signal. Specifically, the linear, frequency modulated (FM) illumination waveform employed in conjunction with the above described target seeker produces an IF signal the frequency of which is proportional to range in accordance with the relationship:

$$f_{IF} = \frac{2R}{C} \frac{\Delta F}{T_s} \quad (1)$$

where R is the range to the target, $\Delta F$ is the modulation bandwidth of the illumination signal, $T_s$ is the sweep time of the illumination signal and C is the speed of light. As seen from Equation 1, for a given value of the modulation bandwidth ($\Delta F$), the backscattered signals can be maintained within a given frequency pass band by control of the illumination signal modulation sweep time ($T_s$) which is the period of time over which the sweep generator 36 causes the voltage controlled oscillator 20 to sweep the bandwidth of the frequency modulation $\Delta F$.

Therefore, the decrease in the frequency of the IF signal components of the mixing products of the mixers 62 and 64, due to the weapon's closing on the target, may be compensated for by increasing the sweep rate of the modulation signal provided by the sweep generator 36 such that, even though the bandwidths of the IF filters 66 and 68 are fixed, the IF signal components of the mixers 62 and 64 remain within the bandwidths of the IF filters 66 and 68. Accordingly, the discriminator 34 operates to control the rate of frequency modulation provided by the sweep generator 36 or, equivalently, controls the sweep time ($T_s$) of the frequency modulation ($\Delta F$) provided by the sweep generator 36. As a decrease in the frequency of the IF signal is detected by the discriminator 34, the discriminator 34 will increase the frequency modulation rate of the sweep generator 36 to maintain a substantially constant frequency for the horizontal and vertical IF signals.

An example of the operation of the target seeker shown in FIG. 3 is described with reference to the waveforms of FIG. 4 for the modulation rate $\Delta F/T_s$ provided by the sweep generator 36. The solid line in waveform 4-A of FIG. 4 represents the continuous wave illumination signal provided by the voltage controlled oscillator 20. From the solid line of the waveform 4-A it can be seen that the frequency of the illumination signal is modulated over a predetermined range (ΔF) which is determined in relation to the number of independent information samples necessary to provide the correlation gain expected for the target seeker as is subsequently more particularly described herein. The frequency modulated illumination signal described by the solid line of the waveform 4-A is provided directly to the circulator 22 and through the phase shifter 26 to the circulator 28. As explained previously, the output signals of the phase shifter 26 are shifted substantially ninety degrees with respect to the phase of the illumination signal. The phase shifted output signals of the circulators 22 and 28 are provided to the polarized antenna 37 to cause the antenna to produce a circular, cross-polarized illumination pattern. The cross-polarized backscattered returns from clutter and target reflectors within the antenna pattern are indicated for six discrete reflectors by the dashed lines of waveform 4-A. These backscattered returns are collected by the orthogonally polarized antenna 37 and provided to the mixer 62 through the phase shifter 24 and also to the mixer 64 while being isolated from the illumination signal of the voltage controlled oscillator 20 by the circulators 22 and 28 respectively. The phase shifter 24 thereby serves to establish phase alignment between the signals provided to the mixers 62 and 64 from the circulators 22 and 28. In the mixers 62 and 64, the cross-polarized backscattered signals are mixed with the illumination signal provided by the voltage controlled oscillator 20 and the mixing products are filtered by the IF filters 66 and 68 to provide horizontal and vertical IF signals respectively. The frequency spectrum of these horizontal and vertical IF signals for the six discrete reflectors of waveform 4-A is illustrated as waveform 4-B of FIG. 4, where waveform 4-B is centered at a predetermined IF frequency.

FIG. 4 also illustrates the change in the modulation sweep rate provided by the sweep generator 36 in response to the discriminator 34 which is necessitated by the decreasing range to the target. As explained previously, the linear, frequency modulated illumination signal employed in the above-described target seeker, in conjunction with the backscattering returns, produces an IF signal, the frequency of which is proportional to range in accordance with Equation 1. As shown in Equation 1, and as illustrated in the waveforms 4-A and 4-B of FIG. 4, for a given value of the frequency modulation bandwidth ΔF of the illumination signal, the difference mixing product of the illumination signal and the backscattered signals can be maintained within a given IF frequency pass band by control of the illumination signal modulation sweep time ($T_s$). In the operation of the target seeker described in FIG. 3, the discriminator 34 has a crossover point which is maintained at the center frequency of the bandwidth of the IF filters 66 and 68.

The IF signals of the horizontal and vertical IF filters 66 and 68 illustrated in the waveform 4-B are then cross-correlated over the sweep time ($T_s$) of the illumination signal by multiplying the horizontal IF signal by the vertical IF signal in the multiplier 78 and integrating the output of the multiplier 78 in the integrator 80 to provide the cross-correlation of the horizontal and vertical IF signals. The level of the cross-correlation signal provided by the integrator 80 is then compared to a predetermined target threshold level in the threshold detector 84 to determine whether, in accordance with the previously described phenomenon, there is sufficient correlation between the horizontally and vertically polarized IF signals to indicate the existence of a man-made target reflector within the range cell of the antenna pattern as defined by the bandwidth of the IF filters 66 and 68.

Since the indication of a man-made target as one of the backscattering reflectors of the antenna pattern is dependent upon the level of the cross-correlation signal of the integrator 80 exceeding the predetermined target threshold level of the threshold detector 84, the proper design of the preferred embodiment of FIG. 3 requires an evaluation of the relative values of the target detection threshold level and the average clutter level of the cross-correlation signal. That is, it is necessary to determine what parameters should be considered to ascertain a predetermined difference between the level of the cross-correlation signal for horizontal and vertical IF signals having correlated target returns and uncorrelated clutter returns and the level of the cross-correlation signal for horizontal and vertical IF signals having only uncorrelated clutter returns. This deviation of correlated target signals ($s$) plus uncorrelated clutter signals ($c$) relative to uncorrelated clutter signals ($c$) as a result of the cross-correlation process is hereafter referred to as the correlation gain.

Since, as was described in relation to FIG. 2, the correlation of returns from man-made reflectors will be higher than the correlation of clutter returns, it will be appreciated that the disparity between the levels of target plus clutter signals ($s+c$) and clutter signals ($c$), will be magnified as the cross-correlation process is extended by increasing the period of integration of the integrator 80.

Figure 5:
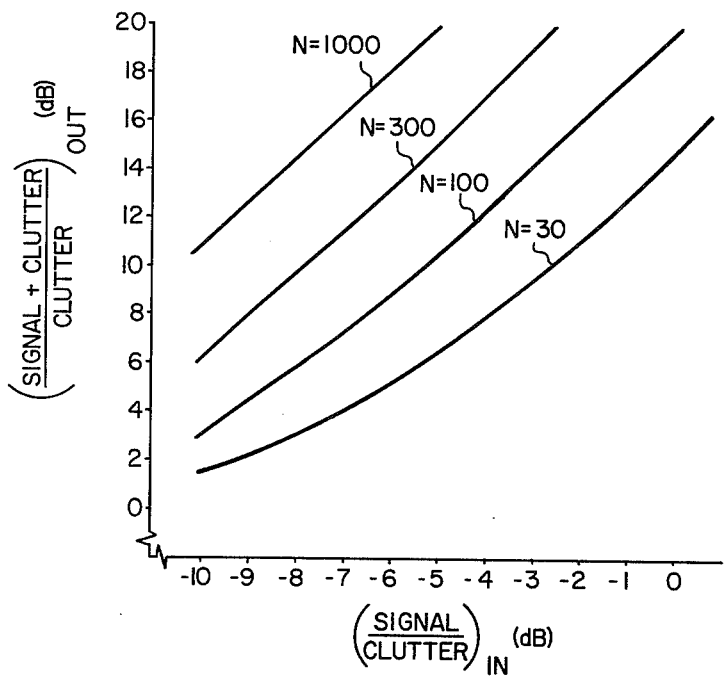
FIG. 5 is a family of curves which represent the correlation gain provided by the present invention as a function of input signal-to-clutter ratio for various numbers of independent information samples.

More specifically, it has been empirically determined from tests under simulated conditions that the relative values that should be established between the predetermined target threshold level of the threshold detector 84 and the average clutter level of the cross-correlation signal of integrator 80 may be determined in relation to the number of independent information samples (N) integrated in the cross-correlation process. For the design of the preferred embodiment, data was collected from simulated conditions to determine the correlation gain ((signal plus clutter)/clutter ratio) of the cross-correlation signal as a function of the number of statistically independent information samples for various values of the signal/clutter ratio of the backscattered returns. The results of this simulation are graphically shown in FIG. 5. As an example of the data obtained from the simulation as illustrated in FIG. 5, if an output (signal plus clutter)/clutter ratio of twelve dB were statistically determined to provide reliable target tracking, that is, if a correlation gain of twelve dB were sufficient to provide dependable tracking of a target, it was found that a −7.5 dB input signal/clutter ratio required that approximately 400 statistically independent information samples be integrated in the cross-correlation process.

It has been determined that the number of information samples integrated in the disclosed cross-correlation process relates directly to the time-bandwidth product of the horizontal and vertical IF signals provided to the multiplier 78. In the disclosed mechanization, the time-bandwidth product is the frequency modulation sweep time ($T_s$) of the illumination signal, as determined by the sweep generator 36, times the bandwidth of the IF filters 66 and 68. Therefore, the number of independent information samples (N) integrated in the cross-correlation process, and, consequently, the correlation gain, may be determined by control of the time-bandwidth product of the IF filters 66 and 68.

The relation between the number of samples (N) integrated in the cross-correlation process and the time-bandwidth product may also be mathematically demonstrated. As well known in the radar art, the time required to sample a slant range interval is expressed by:

$$t = \frac{2(\Delta r)}{C} \quad (2)$$

where $\Delta r$ is the slant range interval and C is the speed of light. As is also well known, the spectrum of a reflected signal is, to a first order approximation, inversely proportional to the period of the signal. The fundamental limit of the spectrum of the return signal is, therefore, determined by the period of the transmitted signal as shown in the following equation:

$$\Delta F = \frac{1}{\Delta t} = \frac{C}{2\delta_r} \quad (3)$$

where $\Delta F$ is the spectrum of the return signal, $\Delta t$ is the period of the transmitted signal, C is the speed of light, and $\delta_r$ is the achievable range resolution of the transmitted signal. Similarly, the signal spectrum ($\Delta f$) associated with the ground range illuminated by the antenna beam may be expressed as:

$$\Delta f = \frac{C}{2\Delta R} \quad (4)$$

where $\Delta R$ is the range extent of the ground area illuminated by the antenna beam. The number of statistically independent information samples (N) which may be obtained from the illumination signal equals the ratio of the spectrum produced by the RF frequency ($\Delta F$) to the received signal spectrum ($\Delta f$) expressed as:

$$N = \frac{\Delta F}{\Delta f} = \frac{\Delta R}{\delta_r} \quad (5)$$

The final expressions in Equations 3, 4 and 5 indicate that the number of independent information samples may be expressed as an excess bandwidth ratio ($\Delta R/\delta_r$) which is defined by the range extent illuminated by the antenna pattern ($\Delta R$) divided by the range resolution ($\delta_r$) theoretically achievable with a given radio frequency bandwidth ($\Delta F$).

It can also be shown that this excess bandwidth ratio can be made equivalent to the time-bandwidth product of the IF filters 66 and 68 by matching the bandwidth of the filters ($\beta_{IF}$) to the received signal spectrum ($\Delta f$) associated with the ground range illuminated by the antenna beam. The frequency of the illumination signal ($F_t$) may be expressed as:

$$F_t = \left(\frac{\Delta F}{T_s}\right) t \quad (6)$$

where t represents real time. The frequency of the return signal ($F_r$) may be expressed as:

$$F_r = \left(\frac{\Delta F}{T_s}\right)(t - \tau) \quad (7)$$

where $\tau$ equals $2\alpha R/C$. The received signal spectrum output of the mixers 62 and 64 which is of interest to the filters 66 and 68 can be expressed as the difference of Equation 7 from Equation 6 or:

$$\Delta f = F_t - F_r = \left(\frac{\Delta F}{T_s}\right)\tau = \left(\frac{\Delta F}{T_s}\right)\left(\frac{2\Delta R}{C}\right) \quad (8)$$

Solving for $\Delta R$ results in the equation:

$$\Delta R = \frac{CT_s(\Delta f)}{2\Delta F} \quad (9)$$

If the bandwidth ($\beta_{IF}$) of the IF filters 66 and 68 is matched to the received signal spectrum ($\Delta f$), one may substitute ($\beta_{IF}$) for the expression ($\Delta f$) in Equation 9 to obtain:

$$\Delta R = \frac{CT_s(\beta_{IF})}{2(\Delta F)} \quad (10)$$

Substituting from Equation 3, one can show that the excess bandwidth ($\Delta R/\delta_r$) equals the time-bandwidth product of the IF filters 66 and 68.

$$\frac{\Delta R}{\delta r} = T_s \beta_{IF} \quad (11)$$

Since the number of information samples (N) can be represented as an excess bandwidth ratio according to Equation 5 and since the excess bandwidth ratio can be made equivalent to the time-bandwidth product in accordance with Equation 11 were the bandwidth ($\beta_{IF}$) of the IF filters 66 and 68 is matched to the received signal spectrum $\Delta f$ produced by the ground range area illuminated by the antenna beam, the number (N) of independent information samples will also be equivalent to the time-bandwidth product provided that the same matched filter condition obtains.

In accordance with the above-described design principles, the fundamental design requirement for the sweep time ($T_s$) of the modulation signal of the sweep generator 36 is determined by the error sensing data rate requirements of the trajectory guidance mechanism for the projectile containing the polarization correlation seeker. The bandwidth of the IF filters 66 and 68 is then determined from the required values of $T_s$ and N according to Equations 5 and 11. That is, for a given sweep time $T_s$ of the illumination signal frequency modulation, as determined by the trajectory guidance mechanism minimum data rate requirements, the number of independent information samples (N) necessary to provide the correlation gain required for the target seeker will determine the bandwidth ($\beta_{IF}$) of the IF filters 66 and 68.

Referring to FIG. 5, it will be seen that a constant level of the cross-correlation signal can be maintained when the bandwidth $\beta_{IF}$ of the IF signals remains constant although the sweep time ($T_s$) for the modulation of the illumination signal grows shorter thereby decreasing the total number of independent information samples (N). Because of an improvement in the achievable resolution $\delta_r$, the signal-to-clutter ratio of the backscattered returns received by the orthogonally polarized antenna 37 increases as the weapon closes on the target. From FIG. 5, it will be seen that, for a significant number of information samples (e.g., $N>30$), the correlation gain is such that the level of the cross-correlation signal $(s+c/c)$ exhibits a substantially linear increase as a function of an increase in the signal-to-clutter ratio of backscattered returns for a constant number of information samples (N), but the level of the cross-correlation signal exhibits a substantially non-linear decrease as a function of a decrease in the number of independent information samples (N) for a constant signal-to-clutter ratio of backscattered returns. By interpolation from FIG. 5, it can also be seen that to maintain a constant level of the cross-correlation signal $(s+c/c)$, the signal-to-clutter ratio of the backscattered signal must increase only at a rate which approximates the logarithmic function of the decrease in information samples N. However, as can be seen from equations 5 and 11, in the physical application of the present invention, while the signal-to-clutter ratio of the backscattered returns increases linearly with decreasing range, the number of independent information samples decreases only linearly with decreasing range. Consequently, the level of the cross-correlation signal actually increases with decreasing range as the polarization correlation target seeker closes on the target.

That is, as the signal-to-clutter ratio of the backscattered returns increases, fewer independent information samples (N) are required to achieve a given level of the cross-correlation signal for distinguishing correlated target signals from uncorrelated clutter signals. The level of the cross-correlation signal is not a constant function of the signal-to-clutter input signal but, for a given number of independent information samples (N), the level of the cross-correlation signal increases with increases of the signal-to-clutter input signal. Moreover, the rate of increase of the level of the cross-correlation signal due to the increase of the signal-to-clutter input signal is greater than the rate of decrease of the cross-correlation signal level due to the decrease in the time-bandwidth product caused by the bandwidth limitations of the filters 66 and 68 so that there is a net increase in the level of the cross-correlation signal gain.

The excess bandwidth ratio of equation 5 may also be used to define the illumination signal frequency modulation $\Delta F$ in relation to known parameters. The illuminated range extent ($\Delta R$) at a range (R) from an antenna having a beamwidth $\theta_B$ and an aspect angle $\alpha$ is given approximately by the expression:

$$\Delta R = \frac{R\theta_B}{\tan \alpha} \quad (12)$$

Substituting Equations 3 and 12 into Equation 5, the excess bandwidth ratio may be described as:

$$\frac{\Delta R}{\delta r} = \frac{2R\theta_B(\Delta F)}{C \tan \alpha} \quad (13)$$

If, as was previously discussed in relation to Equation 5, the excess bandwidth ratio is set equal to the number of samples (N) required to achieve the required level for the cross-correlation signal, then a requirement on the radio frequency bandwidth can be stated as follows:

$$\Delta F = \frac{NC \tan \alpha}{2R\theta_B} \quad (14)$$

Thus, for a given requirement of statistically independent information samples N required at a range R, the necessary frequency modulation ($\Delta F$) is represented by Equation 14. As can be seen from Equation 14, therefore, information samples can be imbued with the requisite statistical independence by providing adequate frequency modulation in the illumination signal. That is, the frequency modulation of the illumination signal provides one coordinate of statistical independence of the information samples.

As indicated for the embodiment of FIG. 3, the above-described target seeker is capable of detecting targets whose backscattering returns are much below the level of clutter backscattering using a frequency modulation of the illumination signal to provide one coordinate of statistical independence in the information samples (N) necessary for the required level of the cross-correlation signal. While the seeker of FIG. 3 provides a desirable level of performance, a target seeker having even higher target detecting capabilities would be even more valuable. However, due to the non-linear relation of the correlation gain of the target seeker as a function of the number of independent information samples (N) which are integrated, significant extensions of the modulation bandwidth ($\Delta F$) of the illumination signal provide only modest improvement in the level of the cross-correlation signal. Additionally, it remains undetermined as to whether cross-polarized backscattering from man-made targets remains correlated over such extremely wide modulation bandwidths.

Figure 6:
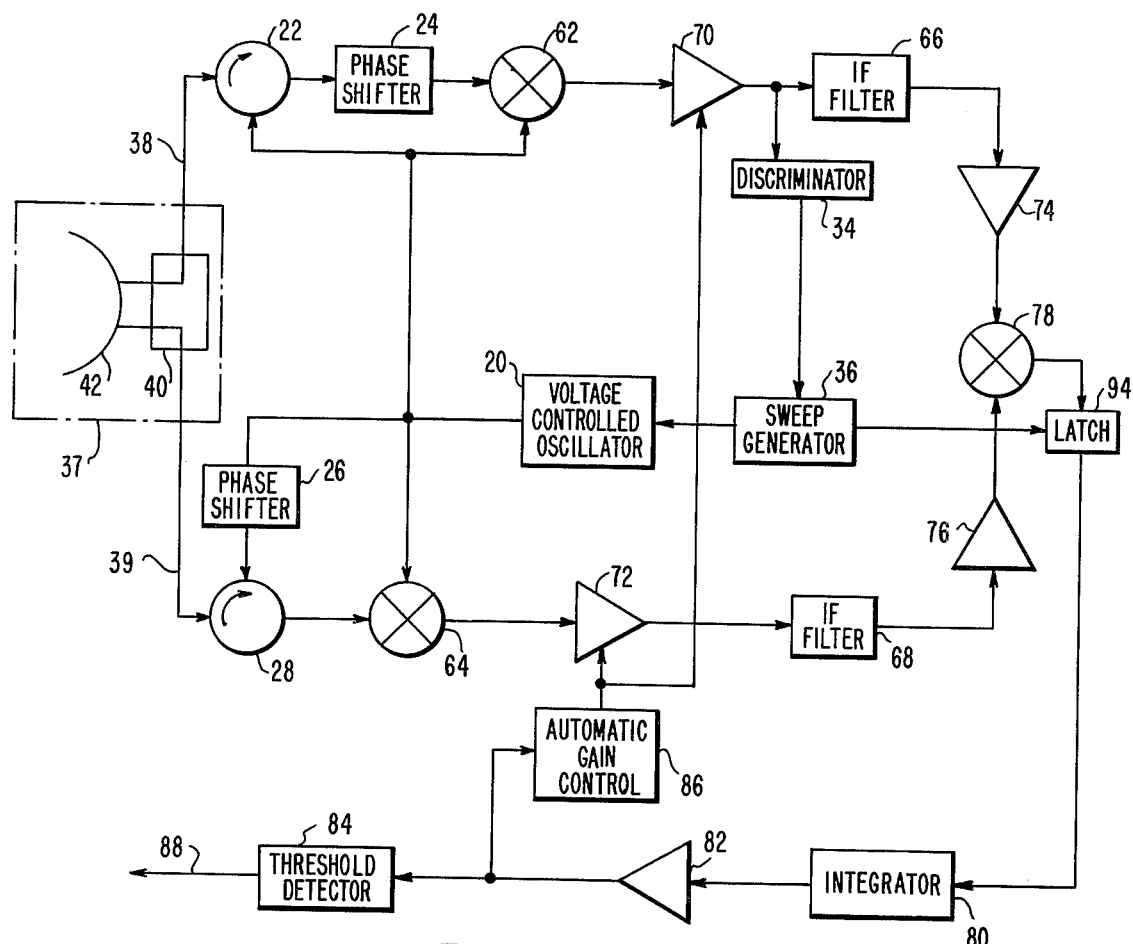
FIG. 6 shows a block diagram of an alternative embodiment of the present invention which operates to discriminate targets in response to information samples which have two coordinates of statistical independence.

In FIG. 6, an alternative embodiment of the target seeker of the present invention provides improved level of the cross-correlation signal by increasing the number of independent information samples (N) integrated in the cross-correlation process through exploitation of the doppler effect upon successive range information samples to provide a second coordinate of statistical independence in the information samples (N). That is, the level of the cross-correlation signal may be significantly increased by exploiting the phenomenon that, when there is a divergence between the direction of propagation of the antenna pattern and the direction of the velocity of the target seeker reference frame relative to the target reference frame, the doppler frequency of the backscattering returns will vary from sweep to sweep of the frequency modulation of the illumination signal. By employing projectile velocities which are nonparallel to the direction of the antenna pattern, successive range information samples may be obtained which have a wide doppler bandwidth and for which the direction of the maximum doppler gradient is substantially orthogonal to the antenna pattern direction. A typical projectile trajectory of the type described is illustrated in FIG. 1 with doppler gradients illustrated by the dashed line 92 for the particular position of the weapon 12 and the antenna pattern line-of-sight (LOS) which is illustrated.

The rate of backscattering decorrelation as a result of changes in the doppler frequency component of the backscattered signal may be mathematically described. The rate of clutter decorrelation, or the rate at which diverse information samples (N) may be obtained, due to the change in the aspect angle to the clutter is given by the expression:

$$B_c = \dot{\theta}/\theta_c \quad (15)$$

where $\dot{\theta}$ is the line-of-sight angular rate and $\theta_c$ is the correlation angle. The correlation angle may be defined as the angle through which the line-of-sight must rotate before the information samples will become statistically independent. The line-of-sight angular rate is given by the expression:

$$\dot{\theta} = \frac{V}{R} \sin \theta \quad (16)$$

where V is the velocity vector of the target seeker reference frame, R is the range to the target and $\theta$ is the angle between the line-of-sight of the antenna pattern and the velocity vector V.

The correlation angle can be expressed mathematically as:

$$\theta_c = \frac{\lambda}{2L} \quad (17)$$

where $\lambda$ is the illumination signal wavelength and L is the diameter of the backscattering surface.

The dimensions of the illuminated backscattering reflectors may be assumed to be defined by the antenna beam pattern so that the diameter dimension L may be expressed as:

$$L = R\theta_B = \frac{R\lambda}{d} \quad (18)$$

where R is the range to the target, $\theta_B$ is the antenna beamwidth, $\lambda$ is the illumination signal wavelength, and d is the antenna diameter. Substituting for L in Equation 17 from Equation 18, the correlation angle of the backscattering from the clutter may be expressed as:

$$\theta_c = \frac{d}{2R} \quad (19)$$

Substituting Equations 16 and 19 into Equation 15 provides the rate of clutter decorrelation, sometimes referred to as the doppler bandwidth, which is described as:

$$B_c = \frac{2V}{d} \sin \theta \quad (20)$$

From Equation 20 it may be seen that the widest doppler bandwidth would result at a value of ninety degrees for $\theta$ the angle between the line-of-sight (LOS) and the velocity vector (V) for which the direction of the antenna pattern is orthogonal to the velocity vector (V) of the projectile.

Therefore, it is seen that the target backscattering signals may have not only a first coordinate of statistical independence due to the direct frequency modulation of the illumination signal, but also a second coordinate of statistical indpendence due to the frequency modulation caused by the doppler effect for certain approach paths to the target. That is, when there is an angle $\theta$ between the velocity vector (V) of the target seeker reference frame and the line-of-sight (LOS) of the antenna pattern, the backscattered signals become statistically independent not only because of the direct frequency modulation of the illumination signal, but also because of the frequency modulation of the backscattering returns due to the doppler effect. Therefore, a target seeker which cross-correlates information samples (N) on the basis of both coordinates of independence may be appropriately referred to as a two coordinate polarization correlation seeker because decorrelation between samples of the clutter return is achieved by changing both the RF frequency of the illumination signal and the aspect angle to the clutter.

A two coordinate polarization correlation seeker is shown in the alternative embodiment of FIG. 6 which is a target seeker as shown in FIG. 3 but appropriately modified to perform correlation operations upon information samples which are statistically independent as a result of both the frequency modulation of the illumination signal and the doppler effect upon the backscattering returns. With regard to the alternative embodiment shown in FIG. 6, the specific modifications made to the target seeker shown in FIG. 3 are that a latch circuit 94 has been added and the time constant of the integrator 80 has been extended to include a multiple of frequency sweep modulations of the illumination signal of the voltage controlled oscillator 20. The latch circuit 94 has a first input which is responsive to the output of the multiplier 78 and a second input which is responsive to an enable signal provided by the sweep generator 36 such that the product signal provided from the multiplier 78 is gated into the integrator 80 so that the integrator 80 is provided with the output of the multiplier 78 only during the active frequency modulation of the sweep generator 36. The gating of the output of the multiplier 78 by the latch circuit 94 has the effect of causing the correlation of the output of the multiplier 78 only during the modulation sweep periods ($T_s$) of the illumination signal. For the example of the integrator 80 comprised of a low pass filter, extending the time constant of the integrator 80 could be accomplished by lowering the pass band of the filter. A typical time constant for the integrator 80 would be such that its integration would include the product signal of the multiplier 78 as gated through the latch circuit 94 over ten to one hundred frequency modulation sweeps ($T_s$) of the illumination signal. For the signal returns illustrated by the dashed lines in the waveform 4-A of FIG. 4, the doppler shift in the return signals would translate the dashed line indicating the return signals in a direction parallel to the frequency axis.

Therefore, the improvement in the level of the correlation signal which is realized by the alternative embodiment of FIG. 6 is obtained by increasing the number of independent information samples (N) which are determined by a first coordinate in relation to the frequency modulation of the illumination signal, and which are determined by a second coordinate in relation to the doppler bandwidth $B_c$. In accordance with the presently disclosed invention, the two coordinate polarization correlation seeker shown in FIG. 6 will show an improved level in the correlation signal as a function of the product of the number of modulation sweeps that are included in the time constant of the integrator 80 and the time-bandwidth product associated with the IF signal of IF filters 66 and 68 where the frequency modulation of the illumination signal is in accordance with Equation 14.

One additional constraint on the operation of the two coordinate polarization correlation seeker is that ($1/T_s$), the modulation rate of the illumination signal, may not exceed ($B_c$), the bandwidth of the frequency modulation resulting from the doppler effect, otherwise the independence of separate samples (N) between sweeps of the illumination signal $T_s$ will not be preserved. The improvement in the level of the cross-correlation signal for the two dimensional seeker of FIG. 6 over the one dimension illumination signal modulation seeker of FIG. 3 is in the range of five to ten dB.

As a typical example of the operation of the alternative embodiment of FIG. 6, a two coordinate polarization correlation seeker contained in a missile having a velocity of 500 feet per second where the correlator has an antenna with a 6 inch diameter and the antenna line-of-sight is preset to an angle $\theta$ of 20° from the velocity vector would have a doppler bandwidth ($B_c$) of approximately 680 Hz. If the modulation frequency ($1/T_s$) of the illumination signal is approximately 680 Hz and the integrator 80 is provided with a time constant of 0.5 seconds, the doppler integration period will include 340 independent sweeps. For these conditions, an improvement in the level of the cross-correlation of coherent signals of approximately 12.5 dB could be expected.

In the polarization correlation seekers of FIGS. 3 and 6, the threshold detector 84 compared the cross-correlation output of the integrator 80 to determine whether the level of the cross-correlation signal is sufficient to indicate that there were correlated signals from a man-made target included in the backscattered returns. In the polarization correlation seekers of FIGS. 3 and 6, however, the comparison of the level of the cross-correlation signal to determine whether correlated signals had been detected was by the means of a conventional thresholding technique which assumed the worst case signal-to-clutter input ratio and compared the level of the cross-correlation signal to a predetermined target threshold level.

However, studies of empirical data have determined that different types of terrain create different characteristic levels of clutter backscattering returns. For example, for an aspect angle of 40°, that is, the angle between the surface of the terrain and the direction of the electromagnetic wave propagating from the radar antenna is 40°, it has been found that the level of clutter backscattering relative to a one square meter target for X-band radar is about −26 dB where the background terrain is open sea, agitated by a 15 to 20 knot wind, but the level is about −19 dB when the background terrain is desert sand. Similarly, the level of clutter backscatter returns has been found to be in the range of −9 dB to −14 dB over heavy vegetation. Therefore, it was determined that an adaptive threshold technique for the polarization correlation seeker would be advantageous. In this manner, a detection decision can be made on the range cell without setting the threshold level to worst case conditions with respect to surrounding clutter.

Accordingly, it was recognized that it would be advantageous to compare the cross-correlation signal of the integrator 80 with an adaptive target threshold level such that the correlation signal detection decision is normalized to the dynamic clutter level rather than the worst case clutter level as with conventional thresholding techniques. It was found that this adaptive target threshold level could be attained through the comparison of the cross-correlation signal with an auto-correlation signal as will be subsequently explained.

It can be shown that for correlated target signal backscattering and for uncorrelated clutter signal backscattering, the cross-correlation of the vertically polarized signals with the horizontally polarized backscattering signals results in a mean cross-correlation value which is substantially equal to the signal-to-clutter ratio (s/c). It can also be shown that the integration of a number of independent samples (N) of the correlated target signals and uncorrelated clutter signals increases the mean value in proportion to N. Moreover, it can be shown that the auto-correlation of the horizontally polarized target and clutter signals provides a mean auto-correlation value of $(1 + (S/C))$ and the auto-correlation of the vertically polarized target and clutter signals provides a mean auto-correlation value of $(1 + (S/C))$. Also, the integration of a number of independent samples of the horizontally and vertically polarized signals increases the mean value of the auto-correlated signals in direct proportion to N. Therefore, it was recognized that by cross-correlating the horizontally polarized signals with the vertically polarized signals and comparing this cross-correlation signal with respect to the auto-correlation of the horizontally polarized signals and the auto-correlation of the vertically polarized signals, the gain of the cross-correlated signals can be detected in relation to an adaptive target threshold. Moreover, it was realized that the integration of a statistically independent number of samples (N) of the cross-correlation and the auto-correlation products would magnify the disparity between the mean values of the cross-correlation and auto-correlation signals in direct proportion to the number of independent samples taken. Therefore, a polarization correlation seeker which could detect the level of the cross-correlation signal in relation to the level of the auto-correlation signal would have an adaptive capacity for normalizing the level of the cross-correlation signal to the dynamic clutter level and would not be limited to a comparison with the worst case clutter level for all backscattering terrains.

Figure 7:
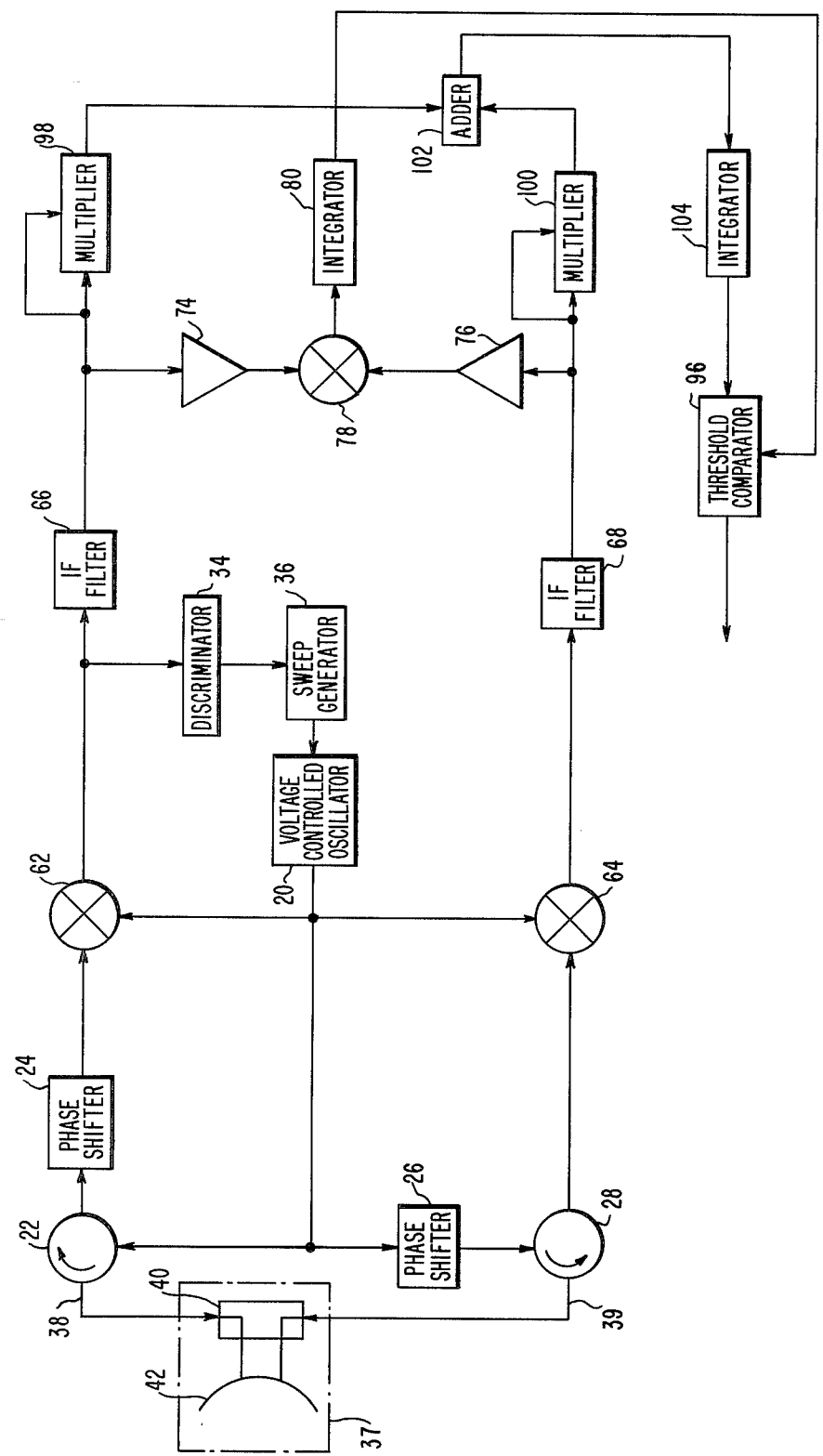
FIG. 7 is a block diagram of another alternative embodiment of the present invention which operates to discriminate targets in relation to an adaptive threshold which is responsive to the dynamic clutter level.

FIG. 7 shows a block diagram of an improved polarization correlation seeker in which the level of the cross-correlation signal indicates the detection of correlated signals backscattered from a man-made target in accordance with the correlation gain which is experienced. The level of the cross-correlation signal is compared with an adaptive threshold provided by the auto-correlation of the cross-polarized backscattered signals to determine the amount of correlation gain.

The polarization correlation seeker of FIG. 7 includes a cross-correlation channel and an auto-correlation channel which are both responsive to the horizontal and vertical IF signals of the IF filters 66 and 68, respectively. Specifically, the correlation channel includes the amplifiers 74 and 76, the multiplier 78, and the integrator 80. The auto-correlation channel includes the multipliers 98 and 100, an adder 102 and an integrator 104. The detection of sufficient correlation gain to indicate the presence of correlated signals reflected from a man-made target is made by a threshold comparator 96. The cross-correlated signals are detected by comparing the cross-correlation signal N (S/C) with an appropriately scaled value of the auto-correlation signal N (1 + S/C)). Specifically, the target threshold level of the cross-correlation signal ($P_c$) is scaled to the level of the auto-correlation signal ($P_a$) such that:

$$P_c \geq \alpha P_a + \beta \quad (21)$$

where $\alpha$ is the thresholding parameter relating to the gain in the cross-correlation signal which will produce an acceptable false alarm rate and $\beta$ is a bias term to preclude false alarms under low signal level conditions. α is selected to preclude false alarms under conditions at which the signal-to-clutter ratio is zero. For a false alarm rate which is on the order of $10^{-4}$, it can be shown that:

$$\alpha = \frac{1}{(\sqrt{N/2.5})-1} \quad (22)$$

where N is the number of independent information samples that exist for the time-bandwidth product correlative to the range (R) at which the seeker is searching for a target.

In FIG. 7, the polarization correlation seeker acts in substantially the same manner as the polarization correlation seeker of FIG. 3 in that the illumination signal is provided by the voltage controlled oscillator 20 to the cross-polarized antenna 37 through the circulators 22 and 28 during which the illumination signal provided to the circulator 28 is phase shifted by substantially 90° in the phase shifter 26 to provide orthogonal polarization in the antenna pattern of the orthogonally polarized antenna 37. The backscattering which is collected by the orthogonally polarized antenna 37 is provided back through the circulators 22 and 28 to the mixers 62 and 64 at which time the signals are again in-phase due to the 90° phase shift of the phase shifter 24. In the mixers 62 and 64, the backscattering returns are mixed with the illumination signal of the voltage controlled oscillator 20 to provide an IF signal to the IF filters 66 and 68 respectively. As was also the case in FIGS. 3 and 6, the discriminator 34 controls the frequency of the IF signal by controlling the sweep time provided by the sweep generator 36 to the voltage controlled oscillator 20. Also, as with the polarization correlation seekers of FIGS. 3 and 6, the polarization correlation seeker of FIG. 7 provides the horizontal and parallel IF signals through the IF amplifiers 74 and 76 respectively to the multiplier 78 in which the horizontal and vertical IF signals are cross-correlated. These cross-correlated signals are then provided to the integrator 80 to form the cross-correlation signal. The embodiment of FIG. 7 is distinguished from the embodiments of FIGS. 3 and 6 in that the gain of the horizontal and vertical backscattering signals provided to the IF filters 66 and 68 is uncontrolled so that the output of the horizontal and vertical IF signals of the IF filters 66 and 68 respectively will have levels which are adaptive to the characteristic clutter level of the backscattering terrain. Moreover, in the embodiment represented in FIG. 7, the output of the integrator 80 is provided to a threshold comparator 96 which determines the correlation gain in relation to the deviation between the level of the cross-correlation signal and the level of an adaptive target threshold signal which is scaled to the auto-correlation signal in accordance with equation 21.

The adaptive clutter threshold signal by which the threshold comparator 96 determines whether the cross-correlation signal of the integrator 80 has sufficient correlation gain to indicate that the horizontal and vertical IF signals are correlated and therefore reflected from a man-made target is provided through the auto-correlation channel which includes the horizontal auto-correlation multiplier 98, the vertical auto-correlation multiplier 100, the adder 102 and the integrator 104. The horizontal multiplier 98 performs an auto-correlation function on the horizontal IF signals of the IF filter 66 and the vertical multiplier 100 performs an auto-correlation function on signals of the IF filter 68. The auto-correlation output signals of the multipliers 98 and 100 are added in the adder 102 to provide an auto-correlation signal. As was discussed above, the mean value of the auto-correlation signal is equal to $(1 + (S/N))$ while the mean value of the cross-correlation signal provided by the multiplier 78 is $(S/N)$ thereby providing a dynamic basis for the determination of the correlation gain of the cross-correlation signal in relation to the clutter level. The auto-correlation signal of the adder 102 is integrated in the integrator 104 which has the same integration time as the integrator 80 so that essentially the same number of independent information samples (N) are integrated in the integrators 80 and 104 over a given time period. Since the cross-correlation and auto-correlation signals are both integrated over N information samples, the disparity between the cross-correlation signal mean value and the auto-correlation signal mean value is enhanced in direct proportion to N, the number of independent information samples obtained. The threshold comparator 96 then compares the level of the auto-correlation signal provided by the integrator 104 as scaled by the thresholding parameter α and the bias term β of Equation 21 with the level of the cross-correlation signal provided by the integrator 80 to determine whether sufficient correlation gain exists to indicate that there is correlation between the horizontal and vertical IF signals caused by specular reflections from a man-made target.

In accordance with the above-described polarization correlation seekers of FIGS. 3, 6 and 7, it will be appreciated that there has been described a seeker for detecting man-made targets which propagates a cross-polarized illumination pattern and mixes cross-polarized backscattering of the illumination pattern in accordance with the operation of a homodyne receiver to provide horizontally and vertically polarized IF signals. A sufficient number of statistically independent samples of the horizontally and vertically polarized IF signals are then cross-correlated to determine whether sufficient gain exists between the cross-correlation signal and the input signal to determine, as based on empirically derived data, that the horizontally and vertically polarized signals are indicative of backscattering from a man-made target. It is also apparent from the above-described embodiments of the herein disclosed invention that the statistical independence of the information samples may be obtained, either conjunctively or disjunctively, by control of the time-bandwidth product of the IF filters 66 and 68 whose bandwidth defines the range resolution capabilities of the target seeker, and by the doppler bandwidth of the signal returns as determined by the diameter of the antenna, the velocity of the polarization correlation seeker, and the angle between the direction of the target seeker velocity and the line-of-sight of the antenna. Furthermore, the correlation gain of the polarization correlation seeker may be determined in relation to the mean value of the cross-correlation signal and the mean value of the auto-correlation of the horizontal and vertical IF signals to provide a basis for determining the correlation gain which is adaptive to the clutter level of the backscattering terrain.

I claim:
1. A seeker circuit comprising:
  means for generating an illumination signal;
  means for mixing first and second polarized return signals with the illumination signal to provide first and second intermediate frequency signals bounded by a predetermined bandwidth;

means for cross-correlating the first and second intermediate frequency signals of said mixing means to provide a cross-correlation product signal; and means for comparing a target threshold level in relation to the cross-correlation product signal of said cross-correlating means to provide a control signal.

2. A seeker circuit comprising:

means for generating a frequency modulated, continuous wave illumination signal;

means for mixing first and second polarized return signals with the illumination signal to provide first and second intermediate frequency signals bounded by a predetermined bandwidth;

means for cross-correlating the first intermediate frequency signal with the second intermediate frequency signal to provide a cross-correlation product signal; and means for comparing the cross-correlation product signal of said cross-correlating means with a target threshold level to provide a control signal.

3. A seeker circuit comprising:

means for generating a frequency modulated, continuous wave illumination signal;

means for mixing cross-polarized backscattering return signals with the illumination signal to provide intermediate frequency signals of predetermined bandwidth;

means for multiplying the intermediate frequency signal associated with a return of one polarization with the intermediate frequency signal associated with another return of a second polarization to provide a cross-correlation product signal;

means for integrating the cross-correlation product of said cross-correlating means over the frequency modulation of said illumination signal;

means for comparing the integrated cross-correlation signal of said integrating means with a target threshold level to provide a control signal.

4. The apparatus of claim 3 in which said generating means comprises:

means for establishing a sweep signal;

a voltage controlled oscillator having a voltage control port which is responsive to the sweep signal;

a first circulator for providing a first antenna input signal in response to the output of said voltage controlled oscillation;

a first phase shifter for shifting the phase of the output of said voltage controlled oscillator;

a second circulator for providing a second antenna input signal in response to the output of said first phase shifter, said second antenna input signal being in phase quadrature with respect to said first antenna input signal.

5. The apparatus of claim 4 including a discriminator for determining the sweep time of the sweep signal in relation to the intermediate frequency signal of said mixing means.

6. The apparatus of claim 3 wherein said mixing means includes:

a first mixer which is responsive to backscattered return signals of a first polarization and which is also responsive to the illumination signal to provide the mixing products of said backscattered return signals in said first polarization and said illumination signal; and a second mixer which is responsive to backscattered return signals of a second polarization which is in quadrature relation to said first polarization, and which is also responsive to the illumination signal to provide the mixing products of said backscattered return signals in said second polarizaton and said illumination signal.

7. The apparatus of claim 6 in which said mixing means further includes:

a first IF filter for separating intermediate frequency signals of a predetermined bandwidth from the mixing products of said first mixer; and a second IF filter for separating intermediate frequency signals of a predetermined bandwidth from the mixing products of said second mixer.

8. The apparatus of claim 3 in which said comparing means includes:

means for amplifying the intermediate signals associated with the cross-polarized backscattering returns;

means for controlling the gain of said amplifying means in relation to a predetermined mean value of the cross-correlation signal of said integrating means; and means for detecting a predetermined threshold level of the cross-correlation signal of said integrating means to indicate the presence of a target.

9. The apparatus of claim 8 wherein said amplifying means comprises:

a first amplifier which is responsive to the output of said mixing means, and a second amplifier which is responsive to the output of said mixing means.

10. The apparatus of claim 9 wherein said controlling means is comprised of a constant false alarm rate circuit.

11. The apparatus of claim 3 further comprising an antenna which is responsive to the illumination signal to propagate a cross-polarized illumination pattern through free space.

12. The apparatus of claim 11 in which said antenna propagates an elliptical illumination pattern, and in which said mixing means mixes the illumination signal with first and second polarized returns of said elliptical illumination pattern, where said polarized returns are in substantially quadrature relation to provide first and second intermediate frequency signals.

13. A seeker circuit comprising:

means for generating a frequency modulated illumination signal;

means for mixing cross-polarized backscattering returns with the illumination signal to provide intermediate frequency signals within a predetermined bandwidth;

means for multiplying the intermediate frequency signals to provide a cross-correlation product signal;

means for integrating the cross-correlation product signal of said multiplying means over a plurality of frequency modulations of said illumination signal to provide an integrated cross-correlation signal comprised of backscattering signals having two coordinates of statistical independence; and means for comparing the cross-correlation signal of said integrating means with a predetermined threshold level to provide a control signal.

14. A seeker circuit comprising:

means for generating a frequency modulated, continuous wave illumination signal;

means for mixing the illumination signal with first and second polarized returns to provide first and second intermediate frequency signals of a predetermined frequency;

means for multiplying the first intermediate frequency signal with the second intermediate frequency signal to provide a cross-correlation product signal;

means for integrating the cross-correlation product signal of said multiplying means over a plurality of frequency modulations of said illumination signal to provide a cross-correlation signal comprised of backscattering signals having two coordinates of statistical independence; and means for comparing the cross-correlation signal of said integrating means with a threshold level to provide a control signal.

15. The apparatus of claim 14 further comprising: an antenna which is responsive to the illumination signal of said generating means to propagate a cross-polarized illumination pattern through free space.

16. The apparatus of claim 15 in which the line-of-sight of the cross-polarized illumination pattern is directed at an angle from the velocity direction of the seeker to provide a second coordinate of statistical independence for said backscattering signals.

17. A seeker circuit comprising:

means for generating an illumination signal;

means fof mixing cross-polarized backscattering return signals with the illumination signal to provide intermediate frequency signals;

means for cross-correlating the intermediate frequency signals of said mixing means to provide a cross-correlation product signal;

means for auto-correlating the intermediate frequency signals of said mixing means to provide an auto-correlaton product signal; and means for comparing the auto-correlaton product signal in relation to the cross-correlation product signal to provide a control signal.

18. A seeker circuit comprising:

means for generating a frequency modulated illumination signal;

means for mixing cross-polarized backscattering return signals wih the illumination signal to provide intermediate frequency signals that are within a predetermined bandwidth which defines a range cell;

means for cross-correlating the intermediate frequency signals of said mixing means to provide a cross-correlation product signal;

means for integrating the cross-correlation product of said cross-correlating means over the frequency modulation of said illumination signal to provide a cross-correlation signal;

means for auto-correlating the intermedate frequency signals of said mixing means to provide an auto-correlation product signal;

means for integrating the auto-correlation product signal of said auto-correlating means over the frequency modulation of said illumination signal to provide an auto-correlation signal; and means for comparing the cross-correlation signal with the auto-correlation signal to provide a control signal.

19. The seeker of claim 18 in which said auto-correlating means includes a multiplier.

* * * * *